United States Patent [19]

Weber et al.

[11] Patent Number: 5,527,844
[45] Date of Patent: Jun. 18, 1996

[54] THERMOPLASTIC MOLDING MATERIALS BASED ON POLYARYL ETHERS AND PARTLY AROMATIC COPOLYAMIDES

[75] Inventors: Martin Weber, Neustadt; Klaus Muehlbach, Gruenstadt, both of Germany

[73] Assignee: BASF Aktiengesellschaft, Ludwigshafen, Germany

[21] Appl. No.: 387,380

[22] Filed: Feb. 13, 1995

Related U.S. Application Data

[63] Continuation of Ser. No. 167,120, Dec. 16, 1993, abandoned, which is a continuation of Ser. No. 906,382, Jun. 30, 1992, abandoned.

[30] Foreign Application Priority Data

Jul. 1, 1991 [DE] Germany .................. 41 21 705.5

[51] Int. Cl.⁶ .................. C08K 5/17; C08K 3/32; C08L 81/02; C08L 81/06
[52] U.S. Cl. .................. 524/237; 524/414; 525/397; 525/434; 525/534; 525/535; 528/324
[58] Field of Search .................. 524/128, 237, 524/414; 525/397, 434, 534, 535; 528/324

[56] References Cited

U.S. PATENT DOCUMENTS

| | | |
|---|---|---|
| 3,729,527 | 4/1973 | Nield .................. 260/857 |
| 3,904,705 | 9/1975 | White .................. 525/430 |
| 4,340,697 | 7/1982 | Aya et al. .................. 525/420 |
| 4,442,249 | 4/1984 | Lees et al. .................. 523/455 |
| 4,537,949 | 8/1985 | Schmidt et al. .................. 528/335 |
| 4,540,772 | 9/1985 | Pipper et al. .................. 528/335 |
| 4,990,564 | 2/1991 | Taubitz et al. .................. 525/397 |
| 5,081,222 | 1/1992 | Reimann et al. .................. 528/339 |
| 5,104,924 | 4/1992 | Goetz et al. .................. 524/508 |
| 5,218,082 | 6/1993 | Reimann et al. .................. 528/339 |
| 5,252,661 | 10/1993 | Reimann et al. .................. 525/432 |
| 5,254,620 | 10/1993 | Goetz et al. .................. 525/425 |

FOREIGN PATENT DOCUMENTS

| | | |
|---|---|---|
| 270997 | 6/1988 | European Pat. Off. . |
| 0477757 | 4/1992 | European Pat. Off. . |
| 2122735 | 6/1971 | Germany . |
| 226082 | 12/1984 | Japan . |
| 8000349 | 3/1980 | WIPO .................. 525/434 |

*Primary Examiner*—Thomas Hamilton, III
*Attorney, Agent, or Firm*—Keil & Weinkauf

[57] ABSTRACT

A thermoplastic molding material consists of from 5 to 95% by weight of a polyaryl ether A, from 5 to 95% by weight of a partly aromatic copolyamide B and, if required, not more than 40% by weight of a fibrous or particulate filler C or a mixture thereof, the percentages being based on the sum of A to C.

13 Claims, 3 Drawing Sheets

THERMOPLASTIC MOLDING MATERIALS BASED ON POLYARYL ETHERS AND PARTLY AROMATIC COPOLYAMIDES

This application is a continuation of U.S. patent application Ser. No. 08/167,120, filed on Dec. 16, 1993, now abandoned, which is a continuation of U.S. patent application Ser. No. 07/906,382, filed on Jun. 30, 1992, now abandoned.

The present invention relates to thermoplastic molding materials, i.e. blends of a polyaryl ether and a partly aromatic copolyamide which may furthermore contain fibrous or particulate fillers, and the use thereof for the production of moldings.

Blends of polyaryl ethers and polyamides are described in, for example, German Laid-Open Application DOS 2,122,735. The addition of polyamide is intended to improve the flow of the polysulfone used. On the other hand, blends prepared from polyamide and the polysulfone having high heat distortion resistance possess substantially improved heat distortion resistance compared with pure polyamide.

If aliphatic polyamides are used, the blends have only slightly improved rigidity compared with the polyaryl ether.

We have found that blends of polyaryl ethers and partly aromatic copolyamides possess excellent rigidity and high heat distortion resistance.

The present invention relates to molding materials which contain
A: from 5 to 95% by weight of a polyaryl ether,
B: from 5 to 95% by weight of a partly aromatic copolyamide and, if required,
C: not more than 40% by weight of a fibrous or particulate filler or a mixture thereof,
the percentages being based on the sum of A to C.

Polyaryl ethers

The preparation of the polyaryl ethers A is generally known (cf. for example GB 1 152 035; U.S. Pat. No. 4,870,153), as is the preparation of polyaryl ethers having a block structure (DE 3 742 264).

Polyaryl ethers have repeated structural elements

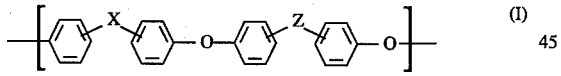

(I)

or $C_1$-$C_6$-alkyl, alkoxy, aryl, chlorine or fluorine derivatives thereof which are substituted in the nucleus, where X and Z independently of one another are each -$SO_2$-, -SO-, -O-, -CO- or -N=N- and Z may furthermore be -S-, -$CR''$=$CR'''$-, a chemical bond or -CRR'-, with the proviso that one or more of the variables X or Z is -$SO_2$- or -CO- where R and R' are each hydrogen, $C_1$-$C_6$-alkyl, $C_1$-$C_6$-alkoxy, aryl or fluorine or chlorine derivatives thereof and $R''$ and $R'''$ are each hydrogen or $C_1$-$C_6$-alkyl.

The polyaryl ethers may contain any terminal groups, for example halogen, methoxy, hydroxyl, phenoxy, benzyloxy or amino end groups.

The molecular weight of the suitable polyaryl ethers (I) is in general 1,500–60,000 g/mol.

If the polyaryl ether segments are present in copolymers (where these can be prepared) having structural units of polyamides, polyesters, aromatic polycarbonates or polyestercarbonates, polysiloxanes, polyimides or polyetherimides, the molecular weights of the block arm or the graft arm in the copolymers is 1,000–30,000 g/mol; blocks of different structures may be arranged alternately or randomly in the copolymers. The amount of the polyaryl ethers in the copolymers should be 3–97, preferably 10–90, in particular 20–80%, by weight. Methods for the synthesis of such copolymers are described in A. Noshay et al., Block Copolymers, Academic Press, 1977.

Suitable process conditions for the synthesis of polyaryl ethers are described in, for example, EP-A-113 112 and EP-A-135 130.

The reaction of the monomers in aprotic polar solvents in the presence of an anhydrous alkali metal carbonate is particularly suitable. A particularly preferred combination comprises N-methylpyrrolidone as the solvent and potassium carbonate as the catalyst, the reaction in the melt also being particularly preferred.

The amount of the polyaryl ethers in the novel molding materials is from 5 to 95, particularly preferably from 15 to 85%, by weight.

Copolyamides B

The partly aromatic copolyamides B used for the novel molding materials consist of, for example,
B1: from 20 to 90% by weight of units which are derived from terephthalic acid and hexamethylenediamine and
B2: from 10 to 80% by weight of units of one or more building blocks B 21, B 22 and/or B 23, i.e.
B21: not more than 50% by weight of units B21 which are derived from ε-caprolactam,
B22: not more than 80% by weight of units B 22 which are derived from adipic acid and hexamethylenediamine and/or
B23: not more than 40% by weight of units B 23 of further polyamide-forming monomers.

For stabilization against oxidative and thermal degradation, not more than 2% by weight of one or more aromatic, secondary amines and/or not more than 2,000 ppm of one or more phosphorus-containing inorganic acids or derivatives thereof (stabilizers) may furthermore be added to the copolyamide or to the blend to be prepared, the amount of stabilizers being based on the proportionate amount of copolyamide.

The amount of units which are derived from ε-caprolactam is preferably from 20 to 50, in particular 25 to 40%, by weight, or the amount of units which are derived from adipic acid and hexamethylenediamine is preferably from 30 to 75, in particular from 35 to 60%, by weight.

The copolyamide may contain both units of ε-caprolactam and units of adipic acid and hexamethylene-diamine; the amount of such units which are free of aromatic groups is not less than 10, preferably not less than 20%, by weight. The units which are derived from ε-caprolactam and those which are derived from adipic acid and hexamethylenediamine may be present in any ratio.

The preferred copolyamides are those whose composition lies within a pentagon (cf. FIG. 1) determined by apices $X_1$ to $X_5$, which are defined as follows:
$X_1$:
  40% by weight of units B1
  60% by weight of units B22
$X_2$:
  60% by weight of units B1
  40% by weight of units B22
$X_3$: 80% by weight of units B1
  5% by weight of units B21
  15% by weight of units B22

X₄:

80% by weight of units B1

20% by weight of units B21

X₅:

50% by weight of units B1 50% by weight of units B21

Polyamides containing from 50 to 80, in particular from 60 to 75%, by weight of units which are derived from terephthalic acid and hexamethylenediamine (units B1) and 20 to 50, preferably from 25 to 40%, by weight of units which are derived from ε-caprolactam (units B21) have proven particularly advantageous for any intended uses.

In addition to the units B1 to B22 described above, partly aromatic copolyamides may contain not more than 40, preferably 10–30, in particular 20–30%, by weight of further polyamide-forming monomers B3, as known for other polyamides.

For example, aromatic dicarboxylic acids, such as isophthalic acid, substituted terephthalic acid and isophthalic acids, e.g. 3-tert-butyl isophthalic acid, polynuclear dicarboxylic acids, eg. 4,4'-diphenyldicarboxylic acid, 4,4'-diphenylmethanedicarboxylic acid, 4,4'- and 3,3'-dicarboxy diphenyl sulfone 1,4- or 2,6-naphthalenedicarboxylic acid and phenoxyterephthalic acid, are suitable for introducing the building block B 23, isophthalic acid being particularly preferred.

Other suitable polyamide-forming dicarboxylic acids are aliphatic dicarboxylic acids of 4 to 16 carbon atoms and suitable polyamide-forming diamines are aliphatic or cycloaliphatic diamines of 4 to 16 carbon atoms. Examples of suitable monomers of this type are suberic acid, azelaic acid and sebacic acid or 1,4-butanediamine, 1,5-pentanediamine, piperazine, 4,4'-diaminodicyclohexylmethane, 2,2-(4,4'-diaminodicyclo-hexyl)-propane or 3,3'-dimethyl-4,4'-diaminodicyclohexylmethane. Caprylolactam, enantholactam, ω-aminoundecanoic acid and laurolactamare suitable from the group consisting of the lactams and amino carboxylic acids.

The following compositions of the component B are particularly preferred:

B1: from 65 to 85% by weight of units which are derived from terephthalic acid and hexamethylenediamine and B23: from 15 to 35% by weight of units which are derived from isophthalic acid and hexamethylenediamine or B1: from 50 to 70% by weight of units which are derived from terephthalic acid and hexamethylenediamine and B22: from 10 to 20% by weight of units which are derived from adipic acid and hexamethylenediamine and B23: from 20 to 30% by weight of units which are derived from isophthalic acid and hexamethylenediamine.

If B23 contains 4,4'-substituted symmetric dicarboxylic acids, it is advisable to convert these into ternary copolyamides with B1 and B21 or B1 and B22, since otherwise the copolyamide has too high a melting point and melts only with decomposition, which is undesirable.

It should be ensured that the partly aromatic copolyamides have a triamine content of less than 0.5, preferably less than 0.3%, by weight.

Partly aromatic copolyamides prepared by most known processes (cf. U.S. Pat. No. 4,603,166) have triamine contents which are above 0.5% by weight, which leads to a deterioration in the product quality and to problems in continuous production. An example of a triamine which causes these problems is in particular dihexamethylenetriamine, which forms from the hexamethylenediamine used in preparation.

Copolyamides having a low triamine content have lower melt viscosities but the same solution viscosity compared with products of the same composition which have a higher triamine content. This considerably improves both the processibility and the product properties.

The melting points of the partly aromatic copolyamides are from 270° to 325° C., preferably from 280° to 310° C. this high melting point also being associated with a high glass transition temperature of generally more than 75° C., in particular more than 85° C. (in the dry state).

Binary copolyamides based on terephthalic acid, hexamethylenediamine and ε-caprolactam and containing about 70% by weight of units which are derived from terephthalic acid and hexamethylenediamine have a melting point in the region of 300° C. and (in the dry state) a glass transition temperature of more than 110° C.

Binary copolyamides based on terephthalic acid, adipic acid and hexamethylenediamine have a melting point of 300° C. or more even with a low content (for example about 55% by weight of units) of terephthalic acid and hexamethylenediamine (HMD), the glass transition temperature being not quite as high as in the case of binary copolyamides which contain ε-caprolactam instead of adipic acid or adipic acid/HMD.

The preparation of partly aromatic copolyamides having a high heat distortion resistance and good mechanical properties is described in, for example, German Laid-Open Application DOS 3,723,688.

According to the invention, partly aromatic copolaymides are preferably understood as meaning those which have a crystallinity of more than 10%, preferably more than 15%, in particular more than 20%.

The crystallinity is a measure of the proportion of crystalline fragments in the copolyamide and is determined by X-ray diffraction.

The preferred partly aromatic copolyamides having a low triamine content are reliably obtained by the processes described in EP-A 129 195 and 129 196.

The relative viscosity of the partly aromatic copolyamides is in general from 2.2 to 5.0, preferably from 2.3 to 4.5, measured in 1% strength by weight solution in 96% strength by weight $H_2SO_4$ at 23° C.

Of course, mixtures of different copolyamides can also be used as copolyamides B, any mixing ratio being possible.

The novel molding materials usually contain, as stabilizers, either an aromatic secondary amine or a phosphorus compound or both. The aromatic secondary amine is used, for example, in amounts of from 0.1 to 2, preferably from 0.5 to 1.5, in particular from 0.7 to 1, by weight. Suitable amines of this type can be described, for example, by the general formula

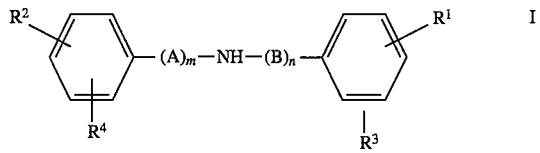

I where m and n are each 0 or 1, A and B are each tertiary carbon which is substituted by $C_1$-$C_4$-alkyl or by phenyl, $R^1$ and $R^2$ are each hydrogen or $C_1$-$C_6$-alkyl in the ortho or para position, which may be substituted by 1 to 3 phenyl radicals, halogen, carboxyl or a transition metal salt of this carboxyl group and $R^3$ and $R^4$ are each hydrogen or methyl in the ortho or para position when m plus n is 1, or tertiary $C_3$-$C_9$-alkyl in the ortho or para position, which may be substituted by 1 to 3 phenyl radicals, when m plus n is 0 or 1.

Preferred radicals A or B are symmetrically substituted tertiary carbon atoms, dimethyl-substituted tertiary carbon being particularly preferred. Tertiary carbon atoms which have 1 to 3 phenyl groups as substituents are also preferred.

Preferred radicals $R^1$ or $R^2$ are para-tert-butyl or tetramethyl-substituted n-butyl, where the methyl groups may preferably be replaced by 1 to 3 phenyl groups. Preferred halogens are chlorine or bromine. Transition metals are, for example, copper or nickel, which can form transition metal salts with carboxy radicals $R^1$ or $R^2$.

Preferred radicals $R^3$ or $R^4$ are hydrogen when m plus n is 2 and tert-butyl is in the ortho or para position, which may be substituted in particular by 1 to 3 phenyl radicals, when m plus n is 0 or 1.

Examples of suitable secondary aromatic amines are described in the German Patent Application P 4 112 324.7, which has not been previously published.

Preferred secondary aromatic amines are diphenylamine and its derivatives, which are commercially available as Naugard® (from Uniroyal).

The novel molding materials furthermore contain, for example, from 100 to 2,000, preferably 200–500, in particular 200 to 400, ppm of one or more phosphorus-containing inorganic acids or derivatives thereof (based on the polyamide B in the molding material).

Preferred acids are hypophosphorous acid, phosphorous acid or phosphoric acid and salts thereof with alkali metals, sodium and potassium being particularly preferred. Preferred mixtures are in particular hypophosphorous and phosphorous acid or alkali metal salts thereof in a ratio of from 3:1 to 1:3. Organic derivatives of these acids are preferably to be understood as ester derivatives of the abovementioned acids.

The partly aromatic copolyamides are distinguished by very good heat distortion resistance in conjunction with good mechanical properties, good properties being maintained by the high glass transition temperature even after conditioning over a relatively large temperature range. These properties are also shared by the novel blends with polyaryl ethers having high heat distortion resistance.

FILLERS

In addition to the above components, the novel molding materials may contain, for example, not more than 40, preferably from 5 to 35%, by weight of fibrous or particulate fillers or mixtures thereof. Examples of fillers are carbon or glass fibers in the form of woven glass fabrics, glass mats or glass rovings, glass spheres and wollastonite.

Preferred fibrous reinforcing fillers are carbon fibers, potassium titanate whiskers, aramid fibers and particularly preferably glass fibers.

When glass fibers are used, they may be provided with a size and an adhesion promoter for better compatibility with the matrix material. In general, the carbon and glass fibers used have a diameter of from 6 to 20 μm.

The glass fibers may be incorporated in the form of short glass fibers and in the form of rovings. In the finished injection molded article, the mean length of the glass fibers is preferably from 0.08 to 0.5 mm.

Suitable particulate fillers are amorphous silica, asbestos, magnesium carbonate (chalk), powdered quartz, mica, talc, feldspar and in particular calcium carbonate, such as wollastonite and kaolin (preferably calcined kaolin).

Preferred combinations of fillers are, for example, 20% by weight of glass fibers and 15% by weight of wollastonite and 15% by weight of glass fibers with 15% by weight of wollastonite.

In addition to the components described, the novel molding materials may furthermore contain, for example, not more than 40% by weight of further additives, such as flameproofing agents and UV stabilizers.

The novel thermoplastic molding materials can be prepared by conventional processes by mixing in a conventional mixing apparatus, such as a kneader or extruder, preferably a twin-screw extruder, a Brabender mill or a Banbury mill, and then extruding.

In order to obtain a very homogeneous molding material, thorough mixing is necessary. In general, average mixing times of from 0.2 to 30 minutes at from 280° to 380° C. are required for this purpose. The order in which the components are mixed may be varied; thus, 2 components can, if required, be premixed or all components may be mixed together.

The novel molding materials possess high heat distortion resistance, good flow and excellent rigidity (modulus of elasticity).

Because of the high heat distortion resistance and good mechanical properties, the novel molding materials are suitable for the production of moldings, in particular for electrical and electronic components. The high heat distortion resistance in combination with good resistance to chemicals also permits applications in chemical plant construction.

EXAMPLES

The following raw materials were provided:

Polyaryl ethers A $A_1$: Polyaryl ether predominantly having the basic structure of the formula $A_1$, and possessing a viscosity number of 64 ml/g, measured in a 1% strength solution in 1:1 phenol/1,2-dichlorobenzene.

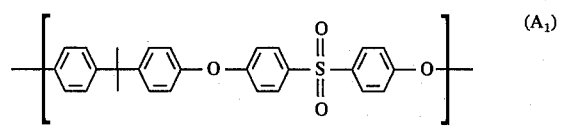

Component $A_2$ $A_2$: Polyaryl ether predominantly having the basic structure of the formula $A_2$ and possessing a viscosity number of 59 ml/g, measured in 1% strength solution in 1:1 phenol/1,2-dichlorobenzene.

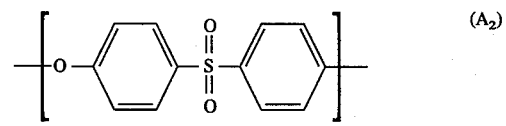

Copolyamide B

B: Partly aromatic copolyamide consisting of 55 parts of terephthalic acid, 35 parts of ε-caprolactam and 38.5 parts of hexamethylenediamine and possessing a relative viscosity of 2.4 (measured in a 1% strength solution in 96% strength sulfuric acid).

Fiber C

C: Glass rovings having a thickness of 10 μm

Comparative polyamide

An aliphatic polyamide (PA) was used for Comparative Experiments:

PA: Polyhexamethyleneadipamide having a K value (according to Fikentscher) of 76, corresponding to a relative viscosity $\theta_{rel}$ of 2.95, measured in a 1% strength solution in 96% strength sulfuric acid.

Preparation of the molding materials

The components were mixed in a twin-screw extruder at a melt temperature of 310° to 350° C. The melt was passed through a water bath and granulated.

The polyamides used (components B and PA) each contain, based on the amount of the polyamides in the blend, 1% by weight of 4,4'-bis-(α,α-dimethylbenzyl)-diphenylamine (Naugard® 445 from Uniroyal) and 500 ppm of $NaH_2PO_3 \cdot 5H_2O$ (commercial product from Merck).

The dried granules were converted into dumbbells and standard small bars at from 310° to 330° C.

The Vicat softening temperature was determined according to DIN 53,460 with standard small bars using a force of 49.05N and a temperature increase of 50K per hour.

The modulus of elasticity was determined according to DIN 53 457-3 using dumbbells.

The composition of the molding materials and the results of the measurements are shown in Tables 1 and 2.

Figure 1:
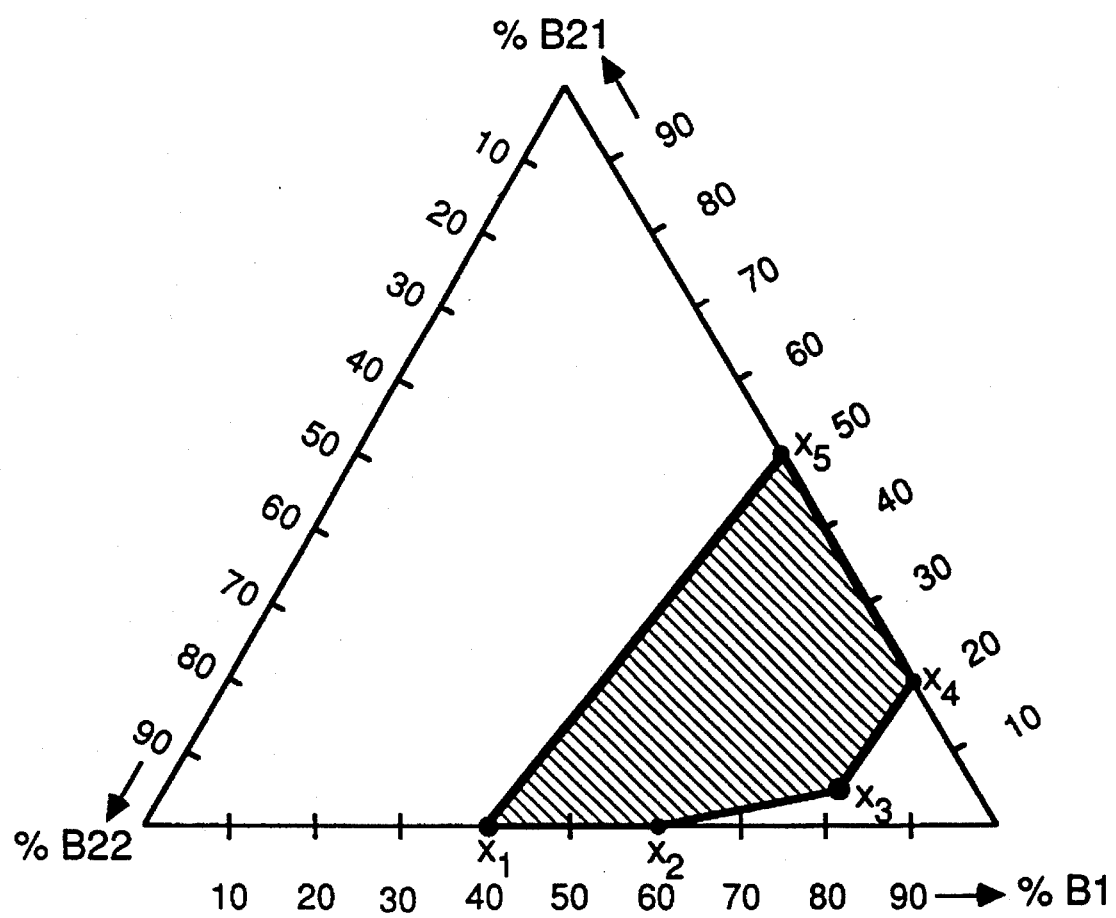
FIG. 1 is a graph showing the composition of the preferred copolyamides.
Figure 2:
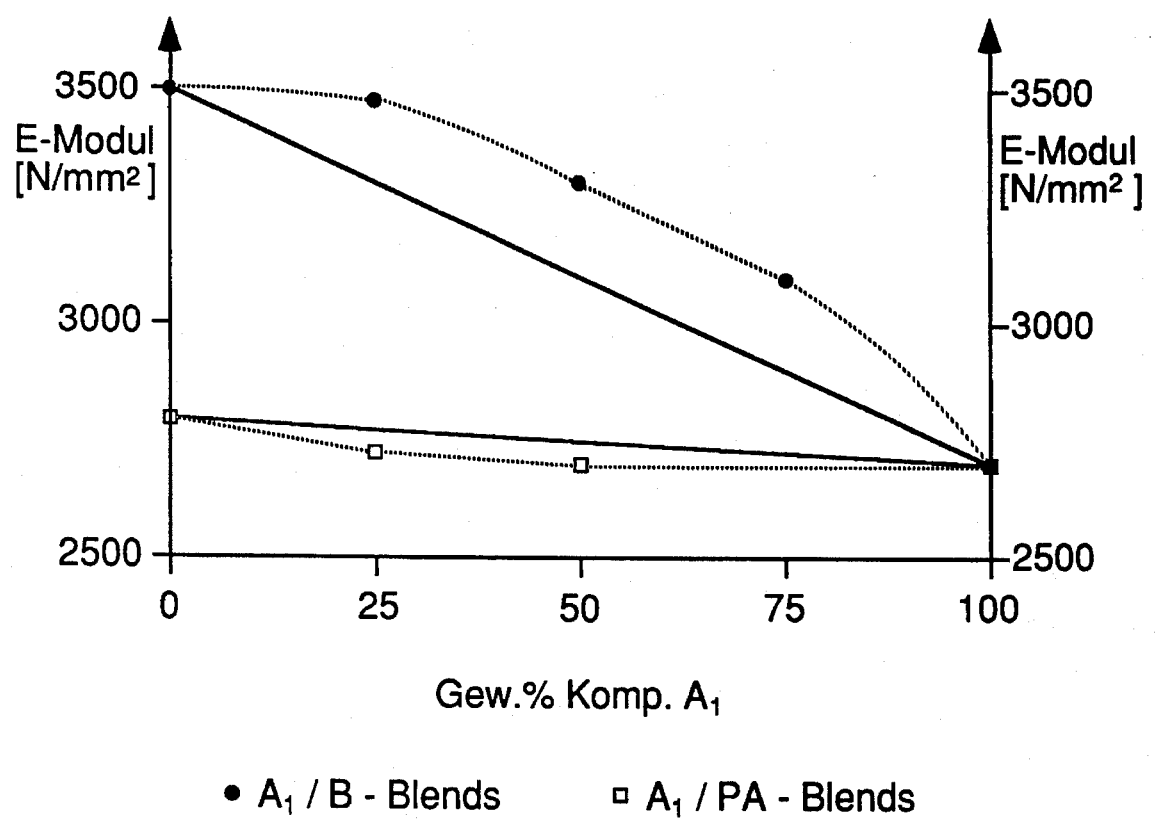
FIG. 2 is a graph showing the modulus of elasticity of various $A_1/B$ and $A_1/PA$ blends.
Figure 3:
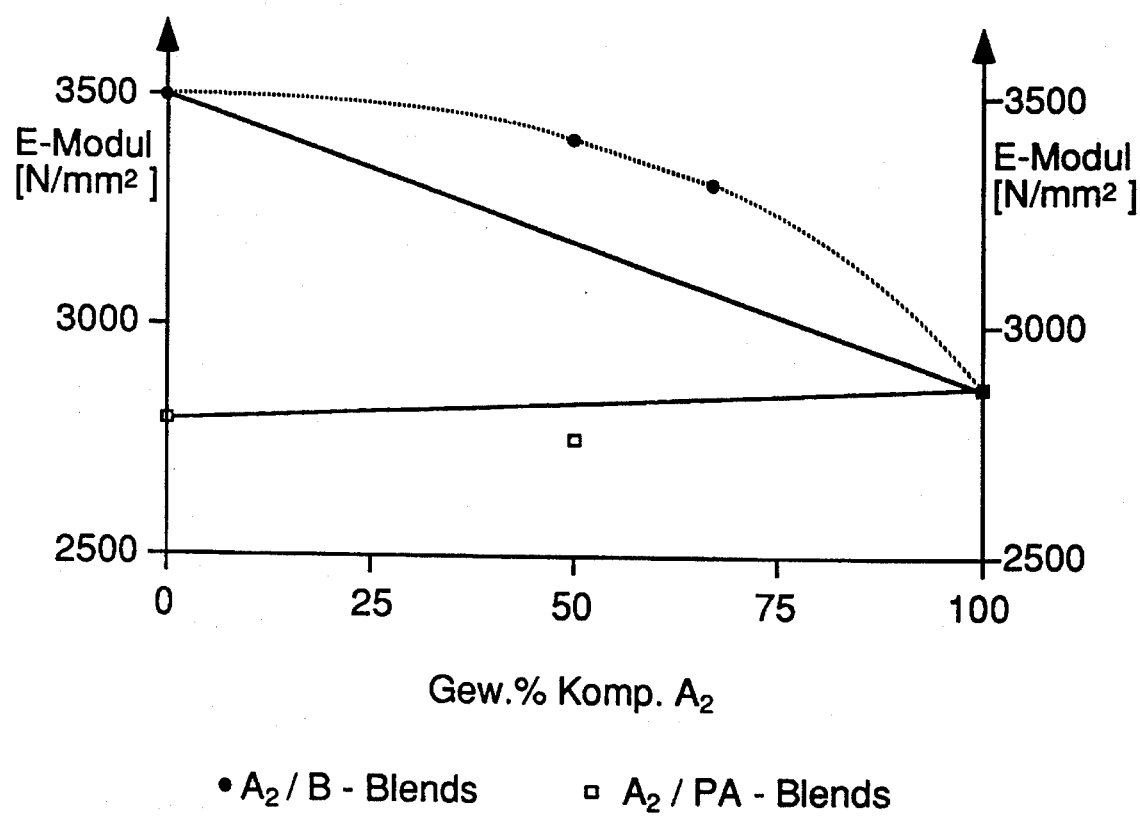
FIG. 3 is a graph showing the modulus of elasticity of various $A_2/B$ and $A_2/PA$ blends.

It is particularly noteworthy that the moduli of elasticity of the blends are above the theoretical values (calculated from the amounts by weight and moduli of elasticity of the components) (FIGS. 2 and 3).

We claim:

1. A molding material containing

A) from 5 to 95% by weight of a polyaryl ether A having repeated structural elements I

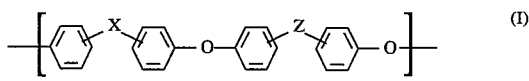

or $C_1$-$C_6$-alkyl, alkoxy, aryl, chlorine or fluorine derivatives thereof which are substituted in the nucleus, where X and Z independently of one another are each $-SO_2-$, $-SO-$, $-O-$, $-CO-$ or $-N=N-$ and Z may furthermore be $-S-$, $-CR^{II}=CR^{III}-$, a chemical bond or $-CRR'-$, with the proviso that one or more of the variables Z or X is $-SO_2-$ or $-CO-$ where R and $R^1$ are each hydrogen, $C_1$-$C_6$-alkyl, $C_1$-$C_6$-alkoxy, aryl or a fluorine or chlorine derivative thereof and $R^{II}$ and $R^{III}$ are each hydrogen or $C_1$-$C_6$-alkyl, B) from 5 to 95% by weight of a partly aromatic copolyamide B, C) from 0 to 40% by weight of a fibrous or particulate filler C or a mixture thereof, the percentages being based on the sum of A to C and

TABLE 1

| Molding material No. | 1 | 2 | 3 | 4 | 5 | V₁ | V₂ | V₃ |
|---|---|---|---|---|---|---|---|---|
| Component [% by weight] | | | | | | | | |
| A₁ | 100 | 75 | 50 | 25 | 0 | 50 | 25 | — |
| B | — | 25 | 50 | 75 | 100 | — | — | — |
| PA | — | — | — | — | — | 50 | 75 | 100 |
| $T_{Vicat}$ [°C.] | 182 | 178 | 179 | 185 | 285 | n.d. | n.d. | n.d. |
| Modulus of elasticity [N/mm²] | 2700 | 3100 | 3300 | 3470 | 3500 | 2700 | 2720 | 2790 | n.d.: not determined

TABLE 2

| Molding material No. | 6 | 7 | V4 | 8 | 9 | 10 | 11 | 12 | 13 |
|---|---|---|---|---|---|---|---|---|---|
| Component [% by weight] | | | | | | | | | |
| A₁ | — | — | — | — | 47 | 47 | 70 | — | — |
| A₂ | 67 | 50 | 50 | 100 | — | — | — | 70 | 47 |
| B | 33 | 50 | — | — | 23 | — | — | — | 23 |
| C | — | — | — | — | 30 | 30 | 30 | 30 | 30 |
| PA | — | — | 50 | — | — | 23 | — | — | — |
| $T_{Vicat}$ [°C.] | 208 | 207 | n.d. | 217 | 183 | 211 | 184 | 214 | 212 |
| Modulus of elasticity [N/mm²] | 3300 | 3400 | 2750 | 2800 | 11000 | 9200 | 9300 | 9700 | 11600 | n.d.: not determined

As shown by the Examples, the novel molding materials possess high heat distortion resistance and rigidity.

D) from 0.1 to 2% by weight of one or more aromatic, secondary amines $D_1$ and from 100 to 2000 ppm of one or more phosphorus-containing inorganic acids $D_2$ or derivatives thereof, the percentages of D being based on B.

2. A molding material as defined in claim 1, containing as compound A a polysulfone predominately having structural units of the formula

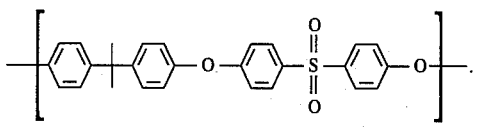

3. A molding material as defined in claim 1, containing as component A a polyether sulfone having structural units of the formula

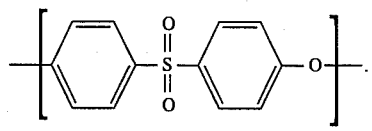

4. A molding material as defined in claim 3, containing as component A a polyaryl ether having a reduced viscosity, measured in N-methylpyrrolidone at 25° C. from 0.3 to 2.5.

5. A molding material as defined in claim 1, containing as component B a partially aromatic copolyamide having a triamine content of less than 0.5% by weight.

6. A molding material as defined in claim 1, containing as component B a partially aromatic copolyamide of
B1: from 20 to 90% by weight of units which are derived from terephthalic acid and hexamethylenediamine and
B2: from 10 to 80% by weight of units of one or more of the building blocks B 21, B 22 or B 23, i.e.
B21: not more than 50% by weight of units B 21 which are derived from ε-caprolactam,
B22: not more than 80% by weight of units B 22 which are derived from adipic acid and hexamethylenediamine or
B23: not more than 40% by weight of units B 23 of further polyamide-forming monomers.

7. A molding material as defined in claim 1, containing as component B a partly aromatic copolyamide of from 50 to 80% by weight of units which are derived from terephthalic acid and hexamethylenediamine and from 20 to 50% by weight of units which are derived from ε-caprolactam.

8. A molding material as defined in claim 1, containing as component C glass fibers, wollastomite, carbon fibers or a mixture thereof.

9. A molding material as defined in claim 1, containing from 15 to 85% by weight of A, from 15 to 85% by weight of B and from 15 to 35% by weight of C.

10. A molding material as defined in claim 1, containing as component $D_1$ a secondary aromatic amine having the formula

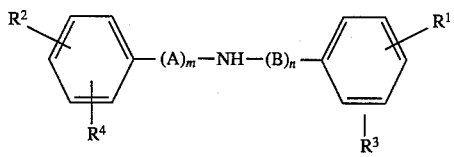

where m and n are each 0 or 1, A and B are each tertiary carbon which is substituted by $C_1$-$C_4$-alkyl or be phenyl, $R^1$ and $R^2$ are each hydrogen or $C_1$-$C_6$-alkyl in the ortho or para position, which may be substituted by 1 to 3 phenyl radicals, halogen, carboxyl or a transition metal salt of this carboxyl group and $R^3$ and $R^4$ are each hydrogen or methyl in the ortho or para position when m plus n is 1, or tertiary $C_3$-$C_6$-alkyl in the ortho or para position, which may be substituted by 1 to 3 phenyl radicals, when m plus n is 0 or 1.

11. A molding material as defined in claim 1, containing as component $D_1$ 4,4'-bis(α, α-dimethylbenzyl)diphenyl amine.

12. A molding material as defined in claim 1, containing as component $D_2$ hypophosphorous acid, phosphorous acid or phosphoric acid or salts thereof with alkali metals.

13. A molding material as defined in claim 1, containing as component $D_2$ hypophosphorous and phosphorous acid or alkali metal salts thereof in a ratio of from 3:1 to 1:3.

* * * * *